UNITED STATES PATENT OFFICE 2,434,015

STABLE PROVITAMIN D COMPOSITION

Hans R. Rosenberg and Warren W. Woessner, Wilmington, Del., assignors to E. I. du Pont de Nemours & Company, Wilmington, Del., a corporation of Delaware No Drawing. Application November 21, 1942, Serial No. 466,496

1 Claim. (Cl. 167—81)

This invention relates to stable provitamin D compositions and more particularly refers to compositions containing in intimate contact provitamin D and a stabilizing agent or agents, as well as processes for the production and use of such compositions.

It is known that many provitamins D deteriorate rapidly upon exposure to air or other natural influences. Some provitamins D are much more susceptible to these deteriorating influences than others. For example, 7-dehydrocholesterol will deteriorate much more rapidly upon exposure to air than will ergosterol. Nevertheless, all provitamins D are subject to deterioration when stored or processed under ordinary conditions. Many attempts have been made to arrest or restrict this deterioration and some of these have been partially successful. However, they are time-consuming and expensive and fail in most instances to produce the desired degree of stabilization.

It is an object of this invention to overcome the foregoing disadvantages and many others which directly or indirectly result therefrom. A further object is to produce provitamins D in such form that they may be stored for long periods of time and under widely varying conditions without serious deterioration or contamination. A still further object is to produce stable provitamin D compositions which facilitate the recovery of unactivated provitamin D after the compositions have been subjected to antirachitic activation. Additional objects will become apparent from a consideration of the following specification and claim.

These objects are attained in accordance with the present invention wherein a composition is produced containing at least 30% provitamin D in intimate contact with a sufficient amount of anti-rachitically inactivatable sterols to stabilize said provitamin D. In a more restricted sense this invention is concerned with a stable provitamin D particularly adapted for antirachitic activation comprising a mass of crystals containing at least 30% provitamin D and at least 20% of antirachitically inactivatable sterols. In a still more restricted sense this invention is concerned with crystals of the foregoing type wherein the stabilizing sterol is cholesterol. In a still more restricted sense this invention pertains to stable provitamins D of the foregoing type wherein the provitamin D is 7-dehydrocholesterol and the stabilizing sterol is cholesterol. In its preferred embodiment this invention is directed to a stable provitamin D comprising a mass of crystals containing approximately 50% 7-dehydrocholesterol and approximately 50% cholesterol. Additional embodiments of this invention are concerned with the employment of the foregoing compositions in antirachitic activation processes wherein they are subjected to the action of ultra-violet light or some other activating medium.

The invention may be more readily understood by a consideration of the following illustrative examples.

Example I

Mixtures of pure 7-dehydrocholesterol and cholesterol in four different proportions were dissolved in ethanol and crystallized from this solvent. The recovered preparations, beautifully white and crystalline, were dried and a spectroscopic analysis showed them to contain, respectively, 22%, 41%, 63%, and 77% of 7-dehydrocholesterol. Conversely, they contained, respectively, 78%, 59%, 37%, and 23% of cholesterol. These samples were then stored in air in the dark at room temperature. Under such conditions of storage pure 7-dehydrocholesterol will show evidence of deterioration in less than two days. The present samples remained unchanged in appearance for more than a week following which the one with the least amount of cholesterol began to show slight evidence of yellowing. At the end of three weeks the sample with the next lowest amount of cholesterol had begun to show some slight discoloration. However, the two samples with the higher cholesterol content remained completely unchanged even after five weeks' storage.

When the above example was repeated, substituting for cholesterol the inactivatable sterols from mussels, substantially similar results were obtained.

Example II

Freshly gathered mussels of the species *Modiolus demissus* (Dillwyn) were subjected to steam for a period of 5 to 10 minutes. The meat was then separated from the shells and was saponified with alcoholic potassium hydroxide in an amount of about one part of alcohol and one-tenth part of potassium hydroxide for one part of the mussel meat. The saponification was carried out at the reflux temperature and was continued over a period of from two to ten hours. After completion of the saponification procedure two parts of water were added per part of the saponification mass. The mixture was then extracted with ether and the ether solution washed neutral with water and dried over a desiccating agent. The ether was then distilled off and the residue was dissolved in 10–20 times its weight of alcohol and the sterol-provitamin D mixture was allowed to crystallize. After recrystallization from alcohol or another suitable solvent, the sterol mixture contained 43% of provitamin D, and 57% of inactivatable sterols.

This sterol mixture was essentially stable on storage under ordinary conditions. On the other hand the provitamin D isolated from mussels of the species *Modiolus demissus* (Dillwyn) proves to be unstable when present in a concentration of 85% or more in mixture with 15% or less of inactivatable sterols.

*Example III*

Mussels of the genus, Modiolus, were subjected to saponification in alcoholic alkali. The sterols isolated as described in Example II contained according to spectroscopic examination 45–50% of provitamin D, and 55 to 50% respectively of inactivatable sterols.

2.8 parts of this sterol mixture were dissolved in 1250 parts of ether which was freshly distilled over sodium. This solution was subjected to irradiation with ultraviolet light according to the well known procedure. After completion of the irradiation, the ether was distilled off and from the residue the unchanged provitamin D together with the inactivated sterols was crystallized by means of alcohol. The crystals were filtered off from the mother liquors which contained the vitamin D. Corn oil was added to these mother liquors and the alcohol distilled off under vacuum leaving the vitamin D dissolved in oil.

The crystals containing provitamin D were found to be extremely stable on storage for prolonged periods.

*Example IV*

The inactivatable sterols isolated from a vegetable oil were recrystallized once from ethyl alcohol. These phytosterols, together with an equal amount of 7-dehydrocholesterol, were dissolved in hot alcohol and allowed to crystallize in the cold. The recovered mixture of sterols containing approximately 50% of 7-dehydrocholesterol was found to be stable on storage and to give excellent yields of vitamin D on antirachitic activation.

The great utility of this invention is apparent when it is applied to the activation of unstable provitamins. For example, when 7-dehydrocholesterol alone in a solution of ethyl ether is irradiated with ultra violet light great care is required to realize the full yield of vitamin D; especially is this the case in large scale or commercial operations. In the latter case it is difficult to recover all of the unchanged 7-dehydrocholesterol and, in the manipulations necessary to this recovery step and in the time which it is necessary to hold the recovered fractions before they can be subjected to further irradiation, deterioration and losses take place. If, however, the 7-dehydrocholesterol is irradiated in the presence of an approximately equal quantity of cholesterol or other inactivatable sterol the operations are carried out with greater ease and increased over-all yields of vitamin D are obtained. Since the cholesterol has only a slight general absorption in the region of the activating wavelengths of light it does not interfere with the irradiation of the provitamin yet its presence greatly facilitates the recovery of unchanged 7-dehydrocholesterol by aiding it to precipitate in crystalline form from the solvents used in the recovery steps. Further, of course, all recovered fractions are crystalline mixtures of 7-dehydrocholesterol and cholesterol and are stable and may be held without deterioration or change till they can be reirradiated. By such a procedure, at little or no cost, increased amounts of vitamin D are secured from the provitamin.

It is to be understood that the foregoing examples are illustrative merely of a few of the many embodiments of the present invention. They may be varied widely with respect to the individual components, the proportions thereof, and their method of production and use without departing from the scope of this invention.

This invention is applicable to the stabilization of all provitamins D. While 7-dehydrocholesterol and mussel provitamin D have been referred to in the examples, it is to be understood that in place thereof or in addition thereto other provitamins D may be employed. A representative few of these provitamins D are ergosterol, epi-ergosterol, 7-dehydrositosterol, 7-dehydrostigmasterol, 7-dehydrocampesterol, epi-7-dehydrocholesterol, 22-dihydroergosterol, etc. These provitamins may be derived from natural sources or they may be synthesized.

In place of, or in addition to, the inactivatable sterols previously described other antirachitically inactivatable sterols may be employed as stabilizing agents. As mentioned heretofore, these inactivatable sterols may be used alone or two or more of them may be used in admixture with one another. Likewise, they may be derived from natural sources or they may be synthesized. An illustrative few of the inactivatable sterols satisfactory for use herein are cholesterol, inactivatable sterols from mussels and other invertebrata, sitosterol, stigmasterol, brassicasterol, ostreasterol, campesterol, fungisterol, zymosterol, clionasterol, fucosterol, dihydrocholesterol, coprosterol, sitostanol, and the like.

It is to be understood that since cholesterol and other inactivatable sterols appear to have the most pronounced stabilizing effect on 7-dehydrocholesterol and on mussel provitamin D these are the preferred embodiments of this invention, particularly the mixture of cholesterol and 7-dehydrocholesterol.

The amount of stabilizing agent used will vary widely depending upon the particular provitamin D to be stabilized and the manner in which it is to be stored or employed. Amounts of stabilizing agents ranging from about 25% to more than 100% of the amount of provitamin D have been found to give excellent results. As a general rule it is advisable to use for optimum results approximately equal amounts of the stabilizing agent and the provitamin D to be stabilized. This is particularly true when 7-dehydrochloresterol is the provitamin D and cholesterol is the stabilizing agent.

Crystalline mixtures of the provitamin D and the stabilizing agent may readily be prepared by dissolving them in a common solvent and permitting them to crystallize from this solvent in accordance with standard crystallization technique. The resulting crystals may be dried and stored for extended periods of time without noticeable deterioration.

When these crystalline stabilized mixtures are subjected to antirachitic activation they are found to dissolve readily in the organic solvents commonly used for this purpose. During activation the presence of the stabilizing agent appears to exert a beneficial effect upon the provitamin D undergoing activation. When the activation is completed the stabilizing agent permits the unactivated provitamin D to be separated readily from the vitamin D present in the solution. This may be explained on the theory that the stabilizing agent and the provitamin D crystallize readily in the same crystal structure thereby accomplishing the dual purpose of facilitating separation of vitamin D from provitamin D and stabilizing the latter. In the absence of this stabilizing agent it would be extremely difficult to separate the unactivated provitamin D from the vitamin D present in the solution. In fact, attempts to separate completely these two components generally result in appreciable destruction or loss of the provitamin D.

By means of the present invention stable provitamin D compositions may be obtained. These compositions can be stored for long periods of time under widely varying conditions without appreciable deterioration or contamination. Likewise, they are particularly adapted for use in antirachtic activation processes since they not only stabilize the provitamin D during its subjection to activating influences but they also facilitate separation of the unactivated provitamin D from the vitamin D at the termination of the activating process. It is well known that in the commercial antirachitic activation of any provitamin D it is highly uneconomical to secure complete transformation of the provitamin on a single exposure to the activating agent. Hence, in carrying out such an operation it is always necessary to recover unchanged provitamin by separating it from the vitamin D and other activation products. Consequently, any expedient which facilitates such operation and increases the efficiency thereof is of considerable importance. Furthermore, these stabilizing agents and in particular cholesterol do not absorb any appreciable amount of activating energy, so their presence does not interfere with this phase of the operation.

As many widely different embodiments of this invention may be made without departing from the spirit and scope thereof, it is to be understood that the invention is not limited to the specific embodiments thereof except as defined in the appended claim.

We claim:

A stable composition particularly adapted for antirachitic activation comprising a mass of crystals containing approximately fifty per cent 7-dehydrocholesterol and approximately fifty per cent cholesterol.

HANS R. ROSENBERG.
WARREN W. WOESSNER.

REFERENCES CITED

The following references are of record in the file of this patent:

UNITED STATES PATENTS

| Number | Name | Date |
| --- | --- | --- |
| 2,163,659 | Boer et al. | June 27, 1939 |
| 1,871,136 | Steenbock | Aug. 9, 1932 |
| 1,902,745 | Windaus | Mar. 21, 1933 |
| 2,234,554 | Elley | Mar. 11, 1941 |
| 2,216,719 | Boer et al. | Oct. 8, 1940 |
| 2,257,176 | Linsert | Sept. 30, 1941 |
| 2,264,320 | Linsert | Dec. 2, 1941 |

OTHER REFERENCES

Koch, Chemical Abstracts, vol. 31, page 1075 (1937).

Koch et al., Journal of Biological Chemistry, vol. 116 (Dec. 1936), pages 757 to 768.